US009246766B2

(12) United States Patent
Burgio

(10) Patent No.: US 9,246,766 B2
(45) Date of Patent: Jan. 26, 2016

(54) METHOD AND APPARATUS FOR A DISTRIBUTED INTERNET ARCHITECTURE

(71) Applicant: Al Burgio, Ontario (CA)

(72) Inventor: Al Burgio, Ontario (CA)

(73) Assignee: IIX Inc., Santa Clara, CA (US)

( * ) Notice: Subject to any disclaimer, the term of this patent is extended or adjusted under 35 U.S.C. 154(b) by 0 days.

(21) Appl. No.: 14/436,409

(22) PCT Filed: Oct. 18, 2013

(86) PCT No.: PCT/CA2013/050790
§ 371 (c)(1),
(2) Date: Apr. 16, 2015

(87) PCT Pub. No.: WO2014/059550
PCT Pub. Date: Apr. 24, 2014

(65) Prior Publication Data
US 2015/0256408 A1    Sep. 10, 2015

Related U.S. Application Data

(60) Provisional application No. 61/715,526, filed on Oct. 18, 2012.

(51) Int. Cl.
G06F 7/04 (2006.01)
H04L 12/24 (2006.01)
H04L 12/939 (2013.01)
H04L 12/46 (2006.01)
H04L 29/06 (2006.01)

(52) U.S. Cl.
CPC ............ *H04L 41/12* (2013.01); *H04L 12/4641* (2013.01); *H04L 49/557* (2013.01); *H04L 63/0815* (2013.01); *H04L 63/0876* (2013.01); *H04L 63/0272* (2013.01)

(58) Field of Classification Search
CPC ............ H04L 63/0815; H04L 63/0876; H04L 63/0272
USPC ........................................................... 726/8
See application file for complete search history.

(56) References Cited

U.S. PATENT DOCUMENTS

| | | | | | |
|---|---|---|---|---|---|
| 6,944,673 | B2* | 9/2005 | Malan | ................. | H04L 12/2602 709/224 |
| 7,725,934 | B2* | 5/2010 | Kumar | ................. | H04L 63/0245 713/188 |
| 7,904,589 | B2* | 3/2011 | Van Der Merwe | ..... | H04L 45/04 370/351 |
| 8,880,657 | B1* | 11/2014 | Angrish | ................. | G06F 9/5072 370/219 |
| 8,989,046 | B1* | 3/2015 | Train | ...................... | H04L 45/02 370/252 |
| 2012/0174217 | A1* | 7/2012 | Ormazabal | ......... | H04L 63/1458 726/22 |

* cited by examiner

Primary Examiner — Samson Lemma
(74) Attorney, Agent, or Firm — David R. Stevens; Stevens Law Group

(57) ABSTRACT

The present disclosure is directed at an Internet Exchange Grid (IEG) which, in one embodiment, provides a distributed Internet architecture.

8 Claims, 2 Drawing Sheets

METHOD AND APPARATUS FOR A DISTRIBUTED INTERNET ARCHITECTURE

CROSS-REFERENCE TO RELATED APPLICATIONS

This application claims the benefit of U.S. Provisional Application No. 61/715,526 filed Oct. 18, 2012 which is hereby incorporated by reference in its entirety.

FIELD

The present disclosure relates generally to Internet Exchange Points. More particularly, the present disclosure relates to a method and apparatus for a distributed Internet architecture.

BACKGROUND

An interact Exchange Point (IXP) is a physical infrastructure through which Internet Service Providers (ISPs), Content Delivery Networks (CDNs) and Enterprise networks exchange traffic between their autonomous systems networks. The primary purpose of the IXP is to allow autonomous system networks to interconnect directly, via the IXP, rather than through one or more third-party networks. The advantages of the direct interconnection are numerous, but the primary reasons are improvements in cost savings, latency, and bandwidth.

In traditional IXPs, the ability to exchange network traffic is only locally considered by using a physical interface on the fabric network switch or router. The drawback to this is the inability to connect other networks that are not physically located on the same IXP fabric or subsequently within the same physical location.

A typical IXP includes one or more Ethernet-based local area network (LAN) switches housed in a single location or metropolitan area. The IXP operates in a layer-2 configuration and utilizes a single IP subnet for participating autonomous systems connections. It is these very design choices that made the traditional IXPs successful, however, they are very centralized in their uses or applications.

It is, therefore, desirable to provide a novel method and apparatus for a distributed Internet architecture.

SUMMARY

It is an aspect of the present disclosure to obviate or mitigate at least one disadvantage of previous Internet Exchange Points.

In a first aspect, the present disclosure provides an Internet Exchange Grid (IEG) or a distributed Internet Exchange Point (IXP) including at least one local gate keeper (LGK); at least one global gate keeper (GGK); and a set of routers and switches connecting the at least one LGK and the at least one GGK.

In another aspect, there is provided a distributed Internet architecture or Internet Exchange Grid including at least one local gate keeper associated with a plurality of users; at least one global gate keeper connected to the at least one LGK; and a set of routers connecting the at least one LGK and the at least one GGK.

In a further aspect, there is provided a method of providing a distributed Internet architecture via an Internet Exchange grid including authenticating a new user attempting to access the Internet Exchange grid; allocating identifier to the new authenticated user; and providing access to identifiers of other authenticated users accessing the Internet Exchange grid to the new authenticated user.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for an Internet architecture. The present disclosure is directed at an Internet Exchange Grid (IEG) which, in one embodiment, provides a distributed Internet architecture.

The present disclosure adopts anew philosophy which may be seen as "Global Routing 1X Domain" or "GRID". Autonomous systems not in the same facility or in the same geographical area my use the grid infrastructure to reach each other by using the GGK for IP prefix announcements. It is the grid architecture that allows for the global routing reachability. In one embodiment, this is accomplished by providing the logical connectivity to unique autonomous systems with a sub-interface that resides within the VFI (Virtual Forward instance) of the grid. This VFI within the grid is on a logical sub-network which all participants of the grid reside.

In effect, the IEG may also serve as the trusted "security" gatekeeper that allows various connected autonomous system networks (eg. Google, Yahoo, etc.) to communicate with each other across the distributed architecture, without each having to exchange authentication information. In other words, each connected network will not need to contact each of the other connected networks (ie. a time consuming, and in some cases an impossible, task) to exchange the authentication information. The exchange of this authentication information is one of the fundamental components for a connected network to be able to communicate with another connected network or networks. It will be understood that not all connected networks will choose to interact with the IEG such that they have another gatekeeper, and in such case, other networks would need to contact those networks (ie. both having to be using a gatekeeper associated with the IEG for the authentication information exchange to occur, otherwise they need to manually exchange this information).

Figure 1:
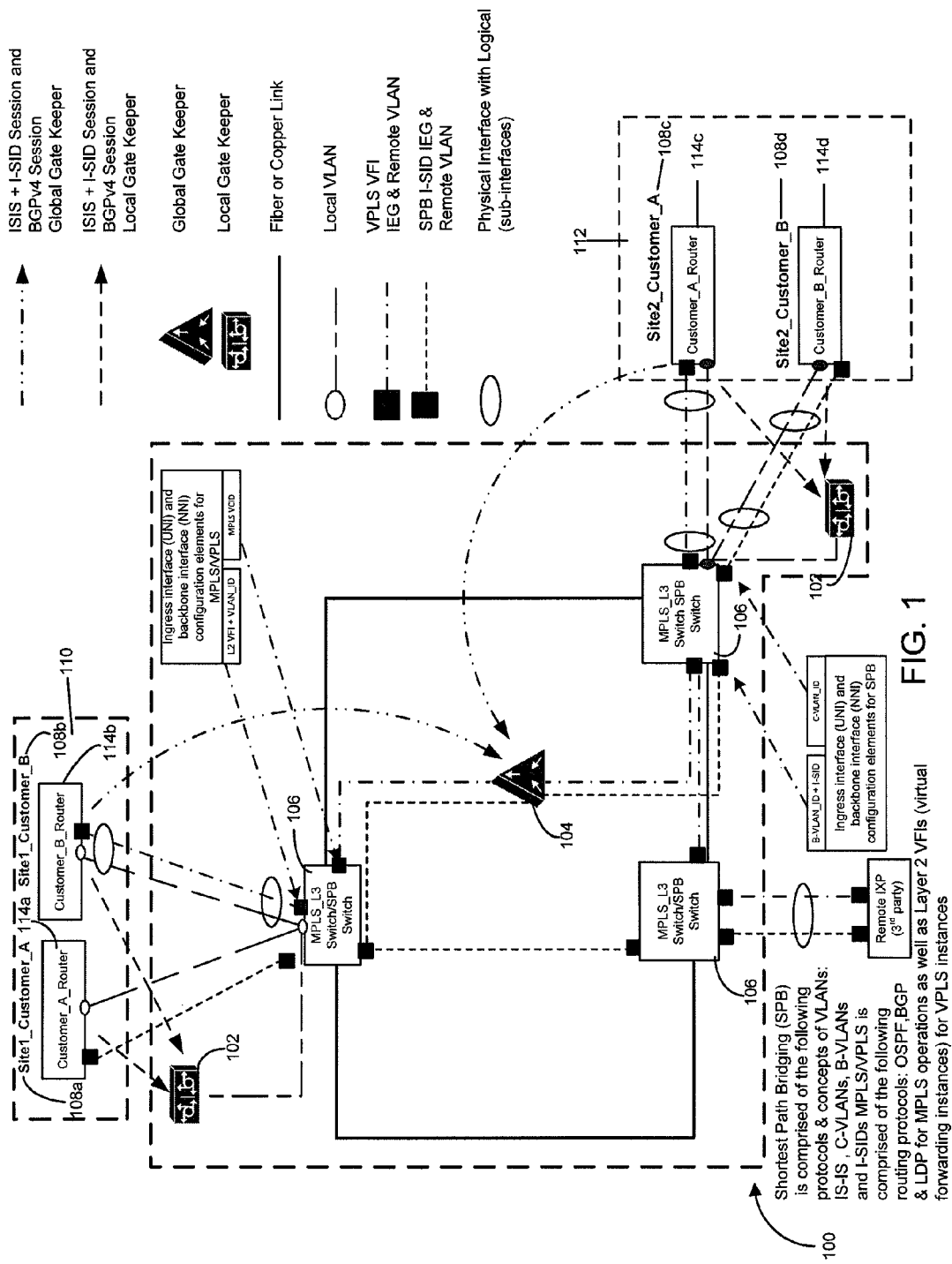
FIG. 1 is a block diagram illustrating an Internet Exchange Grid network architecture.

Turning to FIG. 1, a schematic diagram of an IEG network is shown. Within the network is an IEG 100 which is the apparatus that enhances or provides a distributed Internet architecture. The IEG 100 is designed to modernize traditional Internet Exchange Point (IXP) models as well as to assist in providing a peering ecosystem shift to the distributed Internet architecture model. In the current embodiment, the IEG 100 comprises a number of appliances, or devices, including at least one Local Gate Keeper (LGK) 102, at least one Global Gate Keeper (GGK) 104 and a network of routers 106 which connect the gatekeepers 102 and 104. In the current embodiment, there are two (2) LGKs 102 and one (1) GGK 104. It is the connection between the LGKs 102 and the GGK 104 that form an important part of the IEG 100 when they are logically connected.

In the current description, the word "local" refers to devices or gatekeepers which are associated with a specific group of users or customers while the word "global" refers to devices or gatekeepers which may be accessed by any user or customer. By accessing the IEG 100, users are able to obtain or "peer at" the co-ordinates or information associated with other users that are accessing the IEG 100 at that time. In one embodiment, in order to access the IEG 100, the customers must be authenticated by one of the gatekeepers, either a LGK or the GGK. Furthermore, autonomous systems may refer to discrete sites or customers or group of customers that access the IEG.

In operation, the IEG 100 may be accessed by a plurality of users or customers 108 from multiple sites, or locations. These sites may be seen as individual autonomous systems or may include multiple autonomous systems. Each of the sites may represent users in a city such as, Toronto, New York or London or may be focused on smaller or larger environments. In the current figure, the IEG 100 is being accessed by customers at a first site 110 (i.e. New York) and a second site 112 (i.e. Toronto). Customer site routers 114 (seen as router 114*a* for customer 108*a*, router 114*b* for customer 108*b*, router 114*c* for customer 108*c* and router 114*d* for customer 108*d*) may be connected directly to their associated LGKs 102, the GGK 104 or the routers 106 or a combination of these devices. Although only two customers 108 are shown within each of the sites 110 and 112, any number of customers and any number of sites may access the IEG 100. Along with the routers 106, the LGKs 102 and GGK 104 include software modules which when executed, assist in providing the distributed architecture.

In a preferred embodiment, the LGKs 102 and GGK 104 run the TCP/IP routing daemon BGPv4, which is an inter-autonomous system routing protocol, and act as route servers within the IEG 100. A route server running exterior BGPv4 is capable of importing and exporting BGP advertisement of IPv4 and IPv6 prefixes, however the route server only forwards received prefixes fixes via the control plane, based on configuration policies and does not actually route traffic in the data plane. The LGKs 102 and GGK 104 act as route servers which allow for multilateral peering sessions between two or more connected autonomous systems (seen as the sites), therefore allowing for minimal configuration on the router of each individual customer.

The LGKs 102 and GGK 104 routing daemons facilitate connectivity with participating autonomous systems or sites for the announcement of IPv4 and IPv6 prefixes. Both the LGKs 102 and GGK 104 participate only at the control plane. As there is no interaction with a participating autonomous system at that data plane, each customer who establishes an exterior BGPv4 session with one of the LGK 102 or GGK 104 will announce their IPv4 and IPv6 regional internet registered prefixes to the LGK 102 or GGK 104, or both. The functionality of the LGK 102 and GGK 104 is to forward those announcements to other customers anonymously. In other words, the LGKs 102 and the GGK(s) 104 within the IEG 100 provide the co-ordinates or identification relating to all customers accessing the IEG 100 to all of the other customers accessing the IEG 100.

On operation, each LGK 102 may form its own VLAN within the site. Although not shown, multiple LGKs may be associated with a single site 110 or 112. Therefore, the information or identification associated with customers accessing the IEG 100 is available to all customers connected to the same physical access point or group of local access points that form part of the same local VLAN or an individual LGK 102. Sites or customers using the LGKs 102 provide their BGPv4 peering authentication information to their connected LCK 102 which then exchanges the BGPv4 peering authentication information amongst all autonomous systems, customers or sites connected to the same LGK 102. The autonomous systems using the LGK 102 avoid having to contact other autonomous systems or sites that are connected to the same physical access point or group of local access points on the IEG 100 and exchange their BGPv4 peering authentication information directly. For autonomous systems not using the LGK 102, they would need to directly contact other autonomous systems that are connected to the same physical access point or group of local access points on the IEG 100 in order to exchange their BGPv4 peering authentication information.

The GGK 104 is available to all autonomous systems or sites connected to the IEG 100, regardless if they are connected to the same physical access point or group of local access points. Autonomous systems using the GGK 104 provide their BGPv4 peering authentication information to the GGK 104 which then exchanges the BGPv4 peering authentication information amongst all autonomous systems connected to the same GGK 104. Autonomous systems using the GGK avoid having to contact other autonomous systems that are connected to the IEG 100 and exchange their BGPv4 peering authentication information directly. Autonomous systems not using the GGK 104 would need to directly contact other autonomous systems that are connected to the IEG 100 in order to exchange their BGPv4 peering authentication information.

The LGKs 102 and GGK 104 in effect provide an efficient service to the autonomous systems, or sites, connected to the LGK 102 or GGK 104 by housing their BGPv4 peering information and automatically releasing their IP prefixes and related information to other connected autonomous systems.

In one embodiment, the function of the LGK 102 is to enable local exchange of traffic between autonomous system networks by utilizing its own Virtual Local Area Network (VLAN). The VLAN provides traffic segmentation and security for each of the autonomous system networks who only want to peer with the LGK 102. The GGK 104 also uses its own, but distinct, VLAN to provide traffic exchange to remote IEG 100 locations such as to other sites which are not directly connected.

The IEG 100 includes a number of routers and/or switches 106 that serve as nodes in a meshed network within the IEG 100 that allow for sites, or customers from the multiple sites 110 or 112 to "peer at one or peer at all". In the preferred embodiment, the routers 106 operate on an open shortest path first version 2 (OSPFv2) and border gateway protocol version 4 (BGP4) protocols, however, the routers may operate on other protocols as would be understood. These two preferred protocols allow for the operation of multiprotocol label switching (MPLS) and support multiple address families, specifically, address family Internet Protocol version 4 (IPv4) and address family Internet Protocol version 6 (IPv6), which are both unicast and multicast capable. MPLS technology is used to establish a Virtual Forwarding Instance (VFI) domain which is the distributed framework architecture that interconnects the GGK devices 104 with the LGKs 102 to create the IEG 100.

In one embodiment of the shortest path first protocol, the customer ASN (or Autonomous System Number) router is allocated a unique VLAN_IDs for both the local and global portion of the IEG 100. The VLAN_IDs allocated to each customer are preferably IEEE 802.1q compliant such that each frame that egresses the customer network and ingresses the IEG 100 is distinguishable as being within exactly one VLAN. IEEE 802.1Q VLAN tagging is used to associated multiple VLAN_IDs to a single customer interface. The 802.1Q VLAN_ID is inserted in to the Ethernet frame between the source MAC address and the ether type/length field. The 802.1Q VLAN_ID is 12 bits in length and specifies which VLAN the frame belongs to.

Shortest path bridging (SPB) or the shortest path first protocol is defined by IEEE 802.1aq standard, where SPB is a generic term for both SPB-VID and SPB-MAC. Overall, SPB combines the data path with IS-IS link state control protocol between two network to network interfaces (NNI). IS-IS is used for communications of the network topology and the shortest path computation trees for all nodes within a given region. The control plane for SPB is based on IS-IS with a small number of extensions defined in RFC 6329.

In a preferred embodiment, the local VLAN network for each LGK 102 includes a customer ASN connected on the ingress side of the network and a logical sub-interface on the customer router identified by a customer VLAN_ID or C-VLAN. The local VLAN network is isolated to a common portion of the customer site, specifically to the metropolitan area network (MAN) or even within the same physical building. The local segment will have a unique LGK 102 that is associated via the common VLAN_ID for the specific local segment such that, in one embodiment, each local segment per site will have its own LGK 102. As is understood, the division of sites and/or customers into smaller networks may be determined based on various factors such as, but not limited to, location, proximity, user definitions or user request.

In a preferred embodiment, the IEG 100 includes certain characteristics such as a LOCAL_PEERING VLAN. This VLAN is local to an associated site or the LGK and will be extended between the multiple locations in a given site but not any further. In other words, each site may have multiple VLANs but each customer is only associated with one of the VLANs. For example: where LOCAL_PEERING VLAN ID=30, VLAN_ID 30 is handed off to all customers who subscribe to LOCAL_PEERING in the site or portion of the site.

A customer ASN connected on the ingress side of the IEG 100 at the user network interface (UNI), a logical sub-interface on the customer router identified by a customer VLAN_ID or C-VLAN, a service instance identifier (I-SID) configured on the edge SPB router and an associated SPB backbone VLAN_ID (B-VLAN). The B-VLAN is established on the backbone side (network to network interface or NNI) of the IEG and is common within the network backbone on a per SPB instance basis. The combination of the C-VLAN, I-SID and B-VLAN make up a single SPB instance per the 802.1aq IEEE standard. The IEG 100 is made up of the SPB 802.1aq instance and GGK that is associated with the SPB instance which also has a logical interface within the same C-VLAN ID. The IEG can span multiple regions via the wide area network (WAN) within a geographical area allowing for customer ASNs to peering with other customers within another geographical region. This is referred to as the GRID_PEERING VLAN.

In other words, the GRID_PEERING VLAN provides remote connectivity between the metro infrastructures, making us the IEG and will be extended between defined POP locations between markets. For example, the variable may be defined as GRID_PEERING VLAN ID=500.

VLAN_ID 500 is handed off to customers in a given site who subscribe to GRID_PEERING in a site. This connectivity is accomplished by the aforementioned C-VLAN, I-SID association.

Example 1

Customer_A has 10G handoff with 10G CIR. This customer would get 10G I-SID in market 'A' across the backbone to market 'B', a remote peering market.

Example 2

Customer_A has 10G handoff with lower rate CFR to multiple remote IXPs. So, 10G handoff with one or more VLANS (for this example we'll say 5 VLANs with 1G CIR each —a total of 5 Gbps CIR). This customer would be associated with 5 I-SIDs to remote IXPs in remote markets. Each VLAN terminates on 5 different IXP markets, and is made up of 5 different C-VLANs and I-SID associations.

The IEG 100 also includes an IP/MPLS backbone capable of running multiple-protocol BPG or MP-BGP. MP-BGP allows for extensions to BGPv4 routing protocol defined in RFC 2858. MPLS/VPLS pseudo wires (PW), defined in RFC 4448, are configured within the IEG 100 and establish connectivity with the GGK and other peers on the IEG 100. The LOCAL_PEERING VLAN characteristics remain the same as mentioned above, however, the GRID_PEERING VLAN utilizes MPLS/VPLS to establish connectivity over the IEG.

A customer ASN connected on the ingress side of the IEG 100 or IEG network at the user network interface (UNI) is associated with a physical or logical sub-interface on the customer router identified by a customer VLAN_ID configured on the Provider Edge (PE) router and is associated with a VPN_ID & VFI. Defining VFIs on participating MPLS/VPLS routers in the IEG allows for virtual circuit (VC) establishment between devices. These virtual circuits are established by using the label distribution protocol (LDP). This in turn establishes a label switched path or LSP. PE routers who participate in the VPLS domain and are part of the VPLS instances are considered to be part of the IEG 100.

PE routers in this environment learn remote media access control (MAC) addresses from all members in the VPLS instance, remote and directly attached. Split horizon is employed to ensure a loop free environment.

An 802.1Q VLAN trunk interface is configured on the UNI side facing the customer, this allows for the customer to connect to remote market IEG locations. The NNI configuration that establishes connectivity across the IEG is associated with the VFK and VPN_ID as well as defining the IP address of the targeted LDP session. Within this session configuration is where split-horizon is configured to enable loop prevention.]

The VPLS instance is considered to be a full mesh topology, where by all participating nodes in the IEG 100 are connected to each other by MPLS/VPLS. Each targeted LDP session within the VPLS topology is provisioned on a per customer basis and a per site basis.

In accordance with this disclosure, the IEG 100 assists in creating or providing a more distributed network within IXPs. The network of the present disclosure is highly distributed as it relates to networks peering over a globally distributed fabric. The IEG 100 allows for local multi-lateral exchange of traffic between autonomous system networks or sites by using the LGKs 102 as well as remote multi-lateral exchange of traffic by using the GGK 104. As discussed above, It is the interconnection of the GGK 104 with the LGK 102 that produces the IEG 100, or IEG architecture. The IEG 100 uses MPLS technology to logically separate the Local and Global virtual local area networks by using virtual private LAN services (VPLS).

The network is designed to use a common physical interface that attaches to a unique autonomous system to provide access to either the LGK 102 or GGK 104 or both. This interface will use logical interfaces called sub-interfaces. These logical sub-interfaces are instances of a physical interface and therefore allow for the logical separation for LGK 102 traffic and the GGK 104 traffic.

For LGK 102 connectivity, each unique customer ASN will share a common local VLAN to reach the LGK 102 and each member of that local VLAN. For GGK 104 connectivity, each member participating within a specific GRID VLAN will share a common GRID VLAN to reach the GGK 104 and each member participating in that GRID VLAN.

Figure 2:
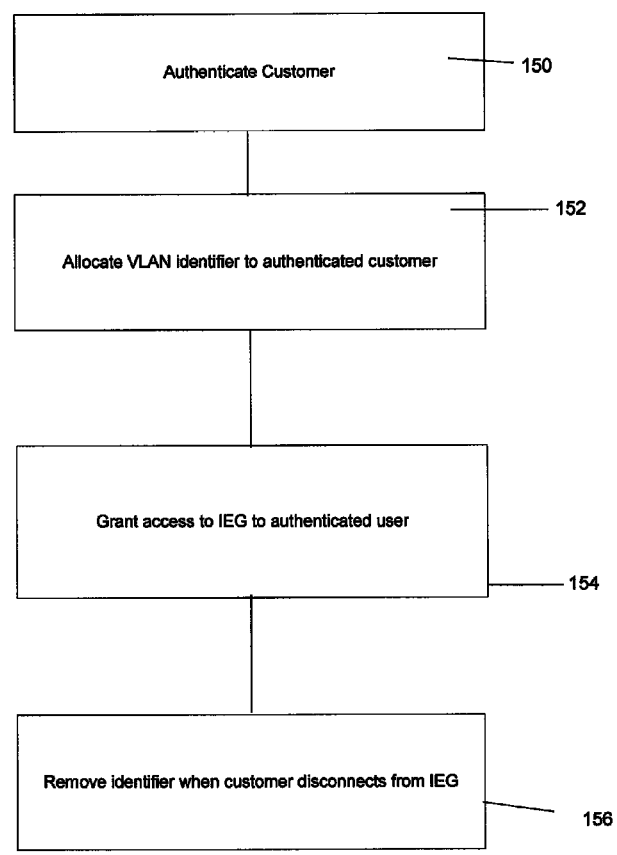
FIG. 2 is a flowchart outlining a method of implementing a distributed Internet architecture.

A first method of implementing a distributed Internet architecture is shown in FIG. 2. When a customer or new user accesses the IEG via one of the gatekeepers 102 or 104, the customer or new user should be authenticated 150 by that gatekeeper. Authentication by the gatekeeper provides customers with the comfort to access the IEG 100 as they recognize that their information is only being provided to others who conform or meet certain standards. It will be understood that the IEG 100 may be operated without this authentication. After gaining access to the IEG, each customer or authenticated new user is then assigned an identifier 152, such as, but not limited to, a VLAN identifier. In one embodiment, the identifier information is stored in the individual LGKs to which the customer is connected. In another embodiment, the identifier information is stored in the GGK. In a further embodiment, the identifier information may be stored in both the LGK and the GGK.

After being assigned the identifier, the customer is granted access 154 to the IEG so that it may peer at or have access to the co-ordinates or information associated with other customers accessing the IEG. Similarly, the identifier information associated with the authenticated new user is also broadcast or available for the users or customers accessing the IEG. Depending on where the identifier information is stored, the authenticated new user may access the global gate keeper for the identifier information or may peer at the LGK associated with specific users that the authenticated new user is interested in accessing. Once the customer leaves the IEG, their VLAN identifier is removed 156 and their information no longer available to customers accessing the IEG.

In an embodiment, the system connects unique autonomous systems (the various sites) physically to the IXP2.0 distributed peering fabric architecture, or IEG, and provides a logical connection via BGPv4 peering session with either Gatekeeper (local or global) or both. These autonomous systems announce their regional internet registry (RIR) registered IP address space via Internet Protocol version 4 (IPv4) or Internet Protocol version 6 (IPv6) address space, known as IP prefixes, to the LGK 102 and/or GGK 104. The LGK 102 will allow for local autonomous systems to exchange routing reachability information with each other and the GGK 104 will allow for distributed peering autonomous systems to exchange routing reachability information with each other. The reachability information then will allow for the exchange or IPv4 and IPv6 network data, voice or video traffic between the "peered" autonomous systems.

The distributed network of the disclosure provides advantages over current centralized IXPs. Advantages include, but are not limited to, peer autonomous systems which can configure BGPv4 sessions with the LGK 102 and/or the GGK 104 once and also allow many other autonomous systems or customers within various sites to peer and exchange traffic; the IEG 100 architecture allows for remote or distance networks to communicate directly with each other without physically having to build a transport network themselves; lower latency between peer autonomous system networks; higher availability to the end-user autonomous systems as the IEG 100 provides an alternative path fir remote autonomous systems; high availability due to minimization of single points of failure paths on the IEG 100 backbone between source and destination autonomous systems; experience tower costs by using scalable network architecture; and providing multiple peer connectivity options by using sub-interfaces that logically separate the LGK 102 traffic and GGK 104 traffic.

In accordance with an aspect of this disclosure, the basic problem of current traditional IXP architectures only being able to provide connectivity on a single subnet and within a single facility is overcome by the use of the method and apparatus of the current disclosure. Firstly, local connectivity by the use of a LGK for IP prefix announcement, enabling traffic exchange and secondly, a unique IEG 100 architecture that provides remote connectivity over a VPLS or VFI instance by way of the GGK on the IEG 100, also used for IP prefix announcements, hence, enabling traffic exchange. The methods and system of the disclosure provide greater flexibility and extensibility to autonomous systems in the distributed peering architecture. Greater routing control, service impacting identification and malicious network traffic mitigation are enhancements the end-user autonomous systems are provided within this architecture.

On one embodiment, the LCK 102 and the GGK 104 may utilize open-source routing daemons (such as OpenBGPd and BIRD) under the use of GPL licensing, and/or certain commercially available routers in order to facilitate the functionality disclosed above.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device volatile or non-volatile, or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of providing a distributed Internet architecture via an Internet Exchange grid comprising:
   at least one local gate keeper (LGK) associated with a plurality of users;
   at least one global gate keeper (GGK) connected to the at least one LGK; and a set of routers connecting the at least one LGK and the at least one GGK;
   authenticating, by hardware processor, a new user attempting to access the Internet Exchange grid; allocating identifier to the new authenticated user; and
   providing access to identifiers of other authenticated users accessing the Internet Exchange grid to the new authenticated user; wherein allocating identifier comprises assigning to the new authenticated user an identifier for a VLAN formed by at least one of an LGK and a GGK that the new authenticated user accesses.

2. The distributed Internet architecture of claim 1 wherein the at least one LGK is associated with a local VLAN network.

3. The distributed Internet architecture of claim 2 wherein the local VLAN network comprises a set of routers associated with the plurality of users.

4. The distributed Internet architecture of claim 1 wherein the set of routers comprise a set of multiprotocol label switching (MPLS) routers connected between each LGK and each GGK.

5. The distributed Internet architecture of claim 1 wherein the at least one LGK and the at least one GGK operate a TCP/IP routing daemon BGPv4.

6. The method of claim 1 further comprising removing the identifier once the new authenticated user leaves the Internet Exchange grid.

7. The method of claim 1 further comprising, after allocating the identifier, storing the identifier in a global gate keeper database.

8. The method of claim 1 further comprising, after allocating the identifier, storing the identifier in a database of an associated local gate keeper.

* * * * *